Figure 6:
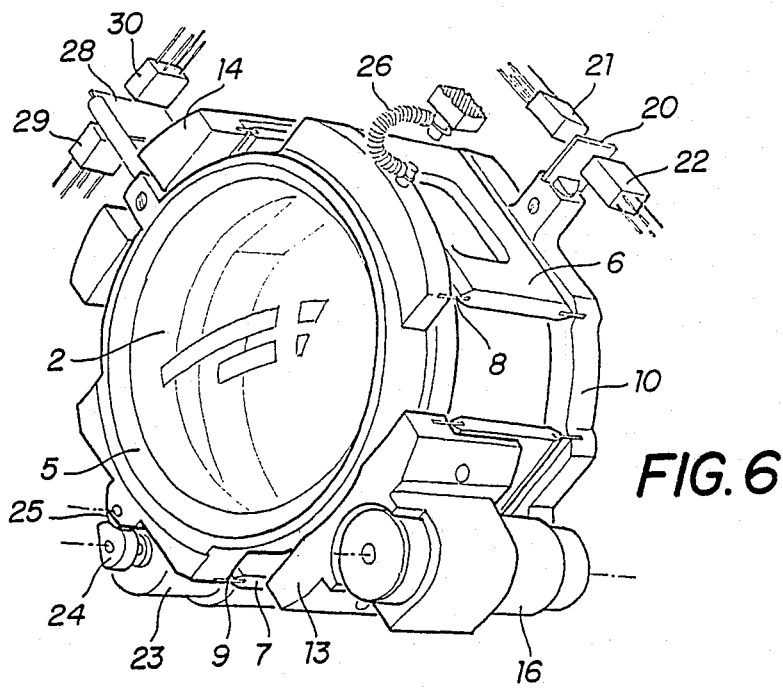

United States Patent [19]
Gross et al.

[11] Patent Number: 4,864,339
[45] Date of Patent: Sep. 5, 1989

[54] APPARATUS FOR STABILIZING AN IMAGE FOCUSED BY A PHOTOGRAPHIC LENS ONTO A PHOTOSENSITIVE SURFACE

[75] Inventors: Daniel Gross, Carouge; Georges Revillet, Onex; Francois Vasey; Marcel Arditi, both of Geneva, all of Switzerland

[73] Assignee: Canon Kabushiki Kaisha, Tokyo, Japan

[21] Appl. No.: 280,424

[22] Filed: Dec. 6, 1988

Related U.S. Application Data

[63] Continuation of Ser. No. 207,029, Jun. 7, 1988, abandoned.

[30] Foreign Application Priority Data

Aug. 15, 1986 [CH] Switzerland .......................... 3291/86

[51] Int. Cl.[4] .............................................. G03B 5/00
[52] U.S. Cl. .................................... 354/202; 350/531
[58] Field of Search ................ 350/531; 354/202, 286

[56] References Cited

U.S. PATENT DOCUMENTS 3,870,416 3/1975 Brady et al. .................... 350/531 X Primary Examiner—Michael L. Gellner
Attorney, Agent, or Firm—Cushman, Darby & Cushman

[57] ABSTRACT

This apparatus includes a lens element (2) associated with first guide means (6, 7) defining a first degree of freedom of this lens element (2) in a plane parallel to the film plane. These first guide means (6, 7) are associated in turn with second guide means (11, 12) defining a second means [sic] of freedom, via a ring (10) parallel to the plane of the lens element (2). These second guide means (11, 12) are hinged to parts (14) that are structurally connected to the body of the camera. Accelerometers (20, 21, 22, 28, 29, 30) measure the acceleration along the two degrees of freedom, and their signals serve to control motors (16, 23) that act via cams (17, 24) on the first and second guide means, respectively, to compensate for the movements recorded by the accelerometers.

8 Claims, 4 Drawing Sheets

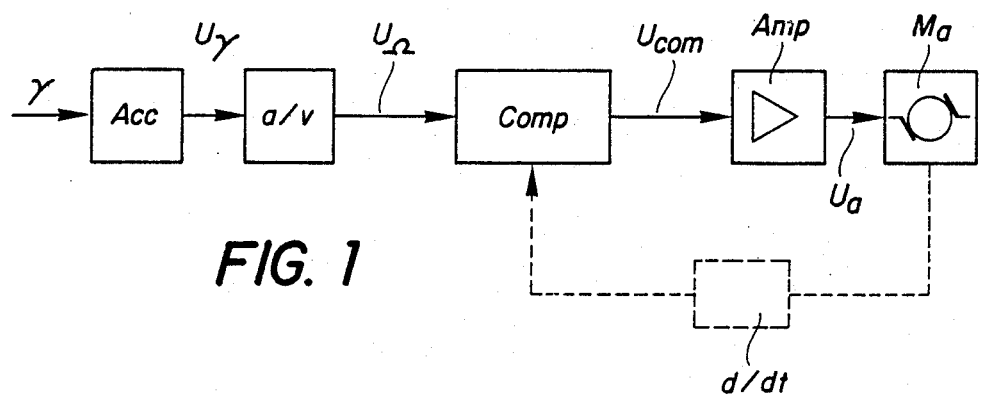
FIG. 1
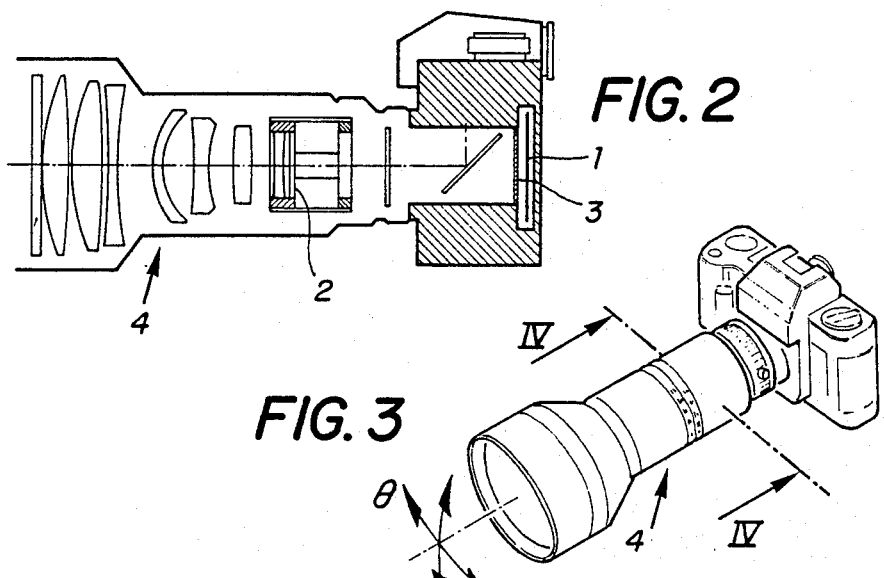
FIG. 2
FIG. 3
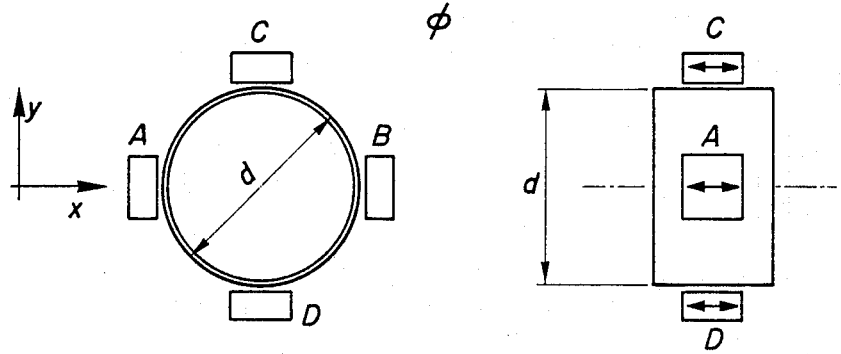
FIG. 4
FIG. 5

APPARATUS FOR STABILIZING AN IMAGE FOCUSED BY A PHOTOGRAPHIC LENS ONTO A PHOTOSENSITIVE SURFACE

This application is a continuation of Ser. No. 07/207,029, filed June 7, 1988, now abandoned, and itself a continuation of Ser. No. 07/085,731, filed Aug. 17, 1987, now abandoned.

The present invention relates to an apparatus for stabilizing an image focused by a photographic lens onto a photosensitive surface, in which an optical element that defines the position of the image on this surface is mounted on guide devices that determine two degrees of freedom located in at least one plane parallel to that of the film, and including means for detecting displacements of the lens as a function of time, means for actuating these guide devices along the two respective degrees of freedom, and means for controlling these actuation means for displacing said guide devices proportionally to the displacements detected along said respective degrees of freedom.

It is known that the more the focal length of a photographic lens increases, the more the sharpness of the image focused onto the plane of the photographic image is affected by oscillating movements of the camera while the photographic film is being exposed. Depending on the individuals, the amplitude and frequency of these movements varies, to the detriment of the sharpness of the photograph at variously long focal lengths. However, no photographer can make a sharp photograph at 1/60 of a second with a telephoto lens longer than 100 mm, without using a tripod. Clearly, the tripod is a limitation for the photographer. Although this limitation is less bothersome in the case where a fixed subject is photographed, such as a landscape or a monument, it is more so for a moving subject, such as a bird in flight.

A great number of stabilizing apparatuses intended to make an element independent of the oscillations of the device to which it is otherwise structurally joined have already been proposed. They are equally applicable to a gun mounted on an armored vehicle or to a submarine periscope exposed to the waves. In the field of optical equipment intended for manual use, several solutions applicable to binoculars have already been proposed, such as that described for example in German Patent Document (C3) 1 772 827, which utilizes a cardan joint and a gyroscope. This mechanism, which controls angular displacements, is not applicable to a portable photographic lens.

An inductive pickup mechanism controlling the power supply of an electromagnetic actuating device is described in German Patent Document (C2) 2 336 867. This solution is based on the angular displacement of a mirror and hence is no longer applicable to a photographic lens.

In German Patent Document (A) 2 152 085, the subject is a floating apparatus. Obviously, a solution of this generic type is theoretically ideal, considering the reduction in inertia of the movable parts immersed in a liquid, but in practical terms it is difficult to use, given the coefficients of expansion between the liquid and its casing, since a camera may be subjected to variations in temperature on the order of 80°. Furthermore, in the solution proposed in this document, the correction is made via angular displacement. It must not be forgotten that in a photographic lens, all the lens elements are aligned on a common axis. Any displacement of the beam of light with respect to this axis produces defects, especially in the chromatics of the image. Clearly, there would be no sense at all in designing a device capable of stabilizing an image if the device also caused other displacements, in particular distortion and chromatic aberrations.

In European Patent Document (B1) 0 025 335, an optical stabilizing device has also been proposed that includes two prisms, which are made to rotate in opposite directions about a common axis. Since these prisms are disposed between two lens elements, the beam of light that emerges from the prisms is more or less misaligned with respect to the lens element located downstream from these two prisms.

In Austrian Patent Document (B) 298 827, an apparatus has been proposed that allows the displacement of the last optical element of a photographic lens in at least one plane parallel to the film plane. However, although this document states that it is possible to effect this displacement with two degrees of freedom in this plane, no practical embodiment whatever illustrates this possibility.

In the piezoelectric X-Y positioning apparatus described in U.S. Pat. No. 4,520,570, it has been proposed that an intermediate mount be provided on the respective ends of two parallel piezoelectric arms, this intermediate mount in turn carrying two other parallel piezoelectric arms, which are oriented at 90° relative to the first arms and on their respective free ends carry the device to be positioned. Because of this structure, the device to be positioned can be displaced in two orthogonal directions X and Y. Nevertheless, the two arms that carry the intermediate mount, like those that are joined to the intermediate mount and carry the device to be positioned, displace the mount and this device along two arcs of circles, such that when the intermediate mount is displaced along the X axis, carrying the device to be positioned along with it, it simultaneously effects a translation along the Y axis, and when the device to be positioned is displaced along the Y axis, the circular arcs described by the free ends of the arms that carry it simultaneously induce a translation along the X axis. As a result, every movement of the device to be positioned along one axis is affected by a parasitic movement along the other axis.

This disadvantage is not found in U.S. Pat. No. (A) 3,870,416, since the movements along the X and Y axes are accompanied by a displacement along the Z axis. However, the apparatus described in this document does not include true guide means that allow displacements only along the X or Y axis, and so it is not suitable for the application under consideration here.

In the case of stabilizing an image for a camera, a number of limitations, not only optical limitations like those mentioned above, but also mechanical limitations, as well as limitations in terms of energy, size and weight, and price, must be addressed. Hence the correction mechanism must operate without play and with minimum friction, taking into account the energy available. The energy consumed must be compatible with existing energy sources for cameras. The size must be such that the mechanism can be accommodated in a telephoto lens.

The object of the present invention is to provide a solution which reaches a compromise capable of meeting these requirements.

To this end, the subject of the invention is an apparatus for stabilizing an image focused by a photographic lens onto a photosensitive surface as defined by claim 1.

The accompanying drawing illustrates various embodiments of the apparatus, shown schematically and by way of example.

Figure 7:
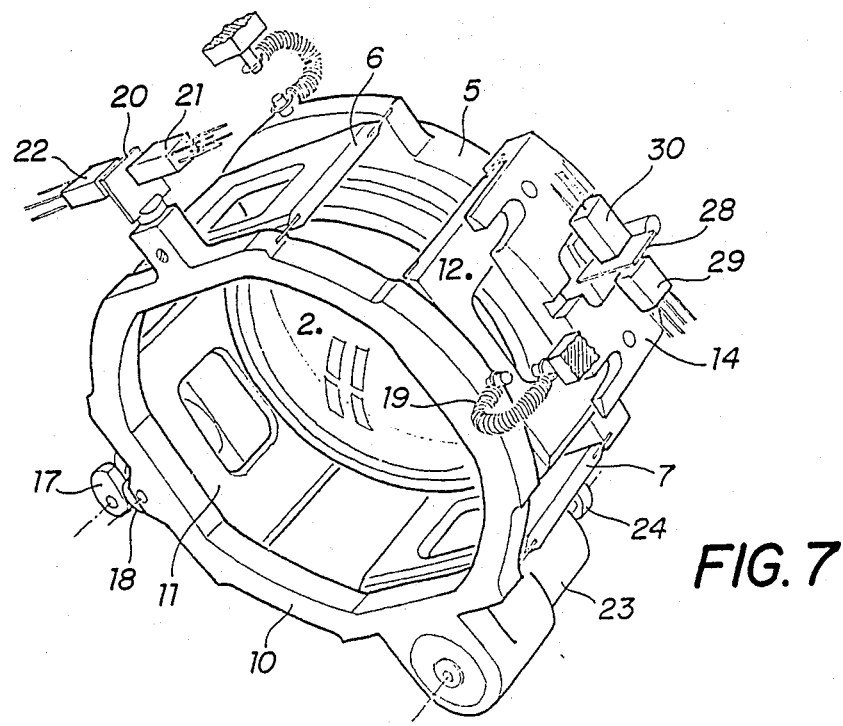
Figure 8:
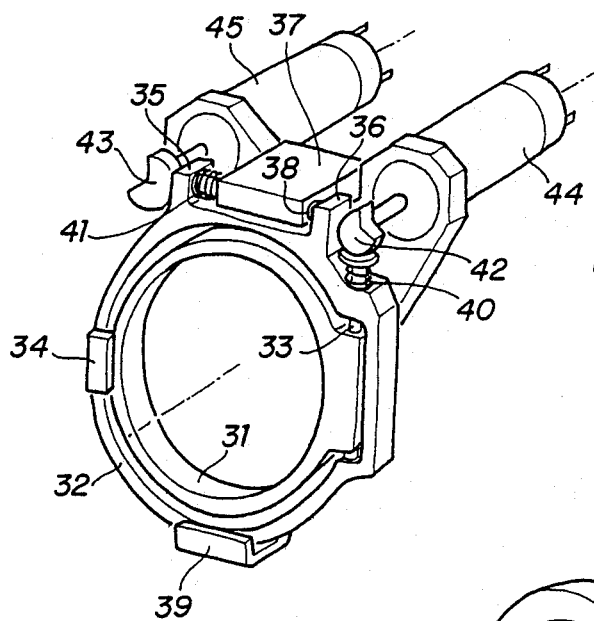
Figure 9:
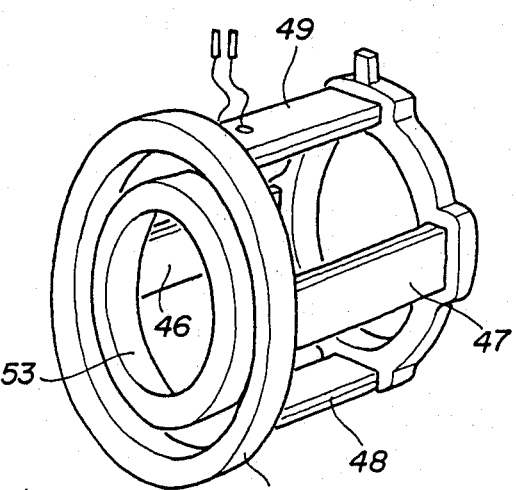
Figure 10:
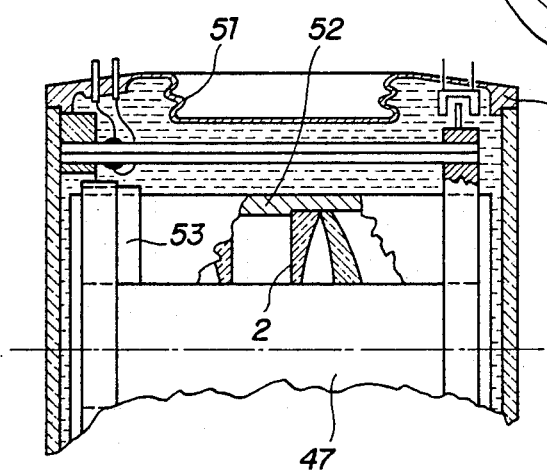
Figure 11:
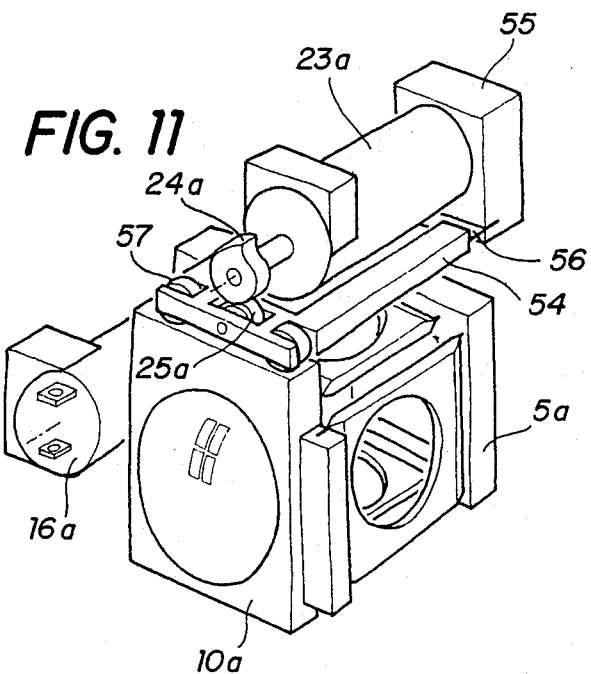
Figure 12:
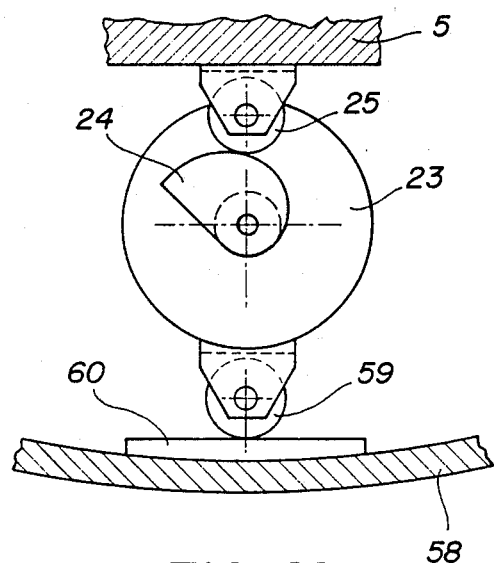

FIG. 1 is a block diagram of the apparatus;
FIG. 2 is a schematic axial sectional view of a camera;
FIG. 3 is a perspective view of a camera equipped with a telephoto lens;
FIG. 4 is a sectional view taken along the line IV—IV of FIG. 3;
FIG. 5 is a side view of FIG. 4;
FIG. 6 is a perspective view of a preferred embodiment of the stabilizing mechanism;
FIG. 7 is another perspective view of this embodiment;
FIG. 8 is a perspective view of another variant of FIG. 6;
FIG. 9 is a perspective view of still another variant;
FIG. 10 is a sectional view taken along the diameter of the variant of FIG. 9;
FIG. 11 is a perspective view of a variant of FIGS. 6 and 7; and
FIG. 12 is a fragmentary end view of another variant of FIGS. 6 and 7.

The design of the image stabilizing mechanism according to the invention was developed following the measurement of the angular frequency, amplitude and speed of the movements of a camera equipped with an f/2.8 300 mm telephoto lens, in a sample of individuals of both sexes. Analysis of these results has shown that the width of the frequency band of the movements to be stabilized is located between 1 and from 10 to 12 Hz. The mean amplitude of displacement during the exposure time of 1/60 s is from 60 to 80 μm, with peaks of 200 to 260 μm, which can reach 300 μm if the total shutter curtain displacement time, which is 24 μs, is taken into account. If the stabilizing mechanism is to be effective, the residual oscillations over the period of 1/60 s must not exceed 20 μm. The maximum linear displacement over the period of 1/60 s is ±0.7 mm, and the maximum instantaneous speed to be compensated for is 25 mm/s, since the maximum acceleration is 0.5 g.

For an angular velocity $\Omega_c$ of the camera, an angular magnification $K_\theta$ of the lens and a linear velocity $V_{1e}$ of the lens element, the following relationship must be adhered to:

$$\Omega_c \cdot K_\theta - V_{1e} \leq 20 \ \mu m/(1/60 \ s).$$

The block diagram of FIG. 1 illustrates the components of the angular stabilization mechanism, which include an acceleration measuring unit Acc, which at its output furnishes a voltage $U_\gamma$ that is proportional to the acceleration $\gamma$ measured. The following unit a/v integrates the voltage $U_\gamma$ which it receives from the acceleration measuring unit Acc, to produce a voltage $U\Omega$ that is proportional to the speed of the camera $\Omega_c$, as a result of this integration. This voltage $U\Omega$ supplies a compensator Comp, which at its output furnishes a compensation voltage $U_{com}$ that is proportional to the instantaneous speed of the camera, which is amplified by an amplifier Amp the output voltage $U_a$ of which serves to control a direct current actuating motor $M_a$, which is connected to the optical group that is to be displaced so as to compensate for the camera movements, in order to stabilize the image focused onto the film plane. A position detector d/dt forms a closed loop between the actuating motor $M_a$ and the compensator Comp. In fact, all the above signals are double, since the angular acceleration is detected along two orthogonal axes.

FIG. 3 is a perspective view of the camera equipped with a telephoto lens 4. The axes $\phi$ and $\theta$ show the angular displacements to be measured in order to effect the necessary compensation. The sectional view of FIG. 4 shows the placement of four linear accelerometers A, B, C, D about a circle having a diameter d, which corresponds to the distance by which these accelerators are spaced apart about the lens. The double arrows $F_1$, $F_2$ and $F_3$ in FIG. 5 show the directions in which the linear accelerometers A, C and D are sensitive.

To measure the angular acceleration along the axes $\phi$ and $\theta$, the difference in the linear acceleration signals divided by the distance d is used, as follows:

$$\theta = (a_A - a_B)/d$$

$$\phi = (a_C - a_D)/d$$

Other arrangements of the accelerometers would make it possible to deduce both the linear and the angular components, using four linear accelerometers. The advantage of the configuration shown here is the isolation of the accelerometers from the major linear components along X and Y, the difference then being zero.

The portion of the apparatus relating to its electronics is not described here, insofar as it is unnecessary for understanding the present invention, since it relates merely to the manner of displacement of the corrective optical element.

The axial section in FIG. 2 is substantially intended to show the disposition of the optical image stabilizing apparatus with respect to the remainder of the lens and to the film. Seen in this section are the film plane 1 and the optical stabilizing apparatus, comprising a lens element or optical group 2 separated from the film by a curtain 3 and hence forming the last optical group of the lens. This optical group 2 receives the rays of light originating in the subject once they have passed through the various other typical optical groups from which a telephoto lens 4 is formed. Because of this, the correction effected by the optical stabilizing element has no other effect whatever on the image focused onto the film plane, except to reduce the relative movement between this image and the film during the exposure of the film. It induces no distortion or chromatic aberration of the image at all, as long as the optical group 2 is displaced absolutely parallel to the film plane and at a practically constant distance from this plane.

FIGS. 6 and 7 illustrate in detail the portion of the lens relating to the optical stabilizing apparatus. The last optical group 2 is fixed in a ring 5 that is hinged to the respective ends of two parallel, diametrically opposed plates 6 and 7 via two flexible tongues 8 and 9 cut from a Mylar ® film and inserted into slits cut into the ring 5 and into the width of each of the plates 6 and 7. These tongues 8 and 9 are introduced into these slits with a play of a few tens of millimeters between the ring and the end of each plate 6 and 7 and are glued to the inside of the slits.

The opposed ends of these plates 6 and 7 are identically hinged to a second ring 10 parallel to the ring 5 in which the optical group 2 is mounted. As a result, these rings 5 and 10 and the plates 6 and 7 flexibly connecting them to one another form a deformable element, of which the cross section perpendicular to its parallel sides comprises a parallelogram. For the sake of simplification, these deformable elements will hereinafter be called "parallelograms".

The second ring 10 is hinged to two other parallel and diametrically opposed plates 11 and 12, in the same manner as described above for the plates 6 and 7. The diametral plane that is perpendicular to the plates 11 and 12 is in turn perpendicular to the diametral plane that is perpendicular to the plates 6 and 7. The other ends of the plates 11 and 12 are also hinged, again via Mylar ® tongues, to two fixation elements 13 and 14 intended to connect the apparatus to a tubular housing 15 that is structurally joined to the body of the lens. The second ring 10 and the plates 11 and 12 along with their hinged ends on the tubular housing 15 form a second deformable parallelogram perpendicular to the first deformable parallelogram. The second ring 10 is accordingly part of both the first and second deformable parallelograms, since the two parallelograms are arranged in series and are connected to one another by the second ring 10. Since one of the ends of each plate 11 and 12 is fixed, the ring 10 hinged to the other end of the same plates can therefore be displaced in the diametral plane perpendicular to the plates 11 and 12 of this parallelogram, causing the corresponding displacement, without deformation, of the first parallelogram 5, 6, 7 and 10. Since the plates 6 and 7 of the first parallelogram are hinged to the ring 10, which in turn is hinged to the plates 11 and 12 of the second parallelogram perpendicular to the first parallelogram, it follows that this ring cannot move except in the plane of deformation of the parallelogram 10, 11, 12 because of the rigidity conferred in a plane perpendicular to this plane of deformation by the plates 11 and 12. Consequently, the ring 10 plays the same role in the plane of deformation of the first parallelogram 5, 6, 7 and 10 as the tubular housing 15 in the deformable parallelogram, so that this ring 10 can displace the ring 10 carrying the optical group 2 solely in the plane of deformation of the parallelogram 5, 6, 7, 10, perpendicular to the plane of deformation of the other parallelogram 10, 11, 12.

Because of this, by acting upon the ring 10 in a plane perpendicular to the plane of deformation of the parallelogram 10, 11, 12, the ring 10 and the ring 5 are displaced in this plane because of the rigidity of the parallelogram 5, 6, 7, 10 in this plane, and by acting on the ring 5 in the plane of deformation of the parallelogram 5, 6, 7, 10, only the ring 5 is displaced in a plane perpendicular to the first plane of deformation, without affecting the other parallelogram 10, 11, 12, because of its rigidity in this plane.

The remainder of the stabilizing apparatus will now be described, and in particular the actuating means that enable the deformation of the two parallelograms.

A first direct current motor 16 is fixed within a receptacle formed in the fixation element 13. The shaft of the motor bears a linear cam 17, which is located facing a portion of the edge of the ring 10 that carries a ball bearing 18 intended to effect a maximal reduction in the friction between the linear cam 17 and the ring 10. The cam 17 and the bearing 18 are pressed against one another by a spring 19 having a substantially constant force that is affixed to the ring 10, on the one hand, and to the tubular housing 15, on the other.

A plate 20 with reflective faces projects from the ring 10 and is located in a plane that is perpendicular to the plane in which this ring 10 is capable of displacement. A photoelectric position detector 21, 22 is disposed on each side of the plate 20. The position of equilibrium corresponds to that in which each detector receives the same quantity of light reflected by the plate 20 and emitted by a light-emitting diode associated with each detector. This position of equilibrium is selected when the center of the linear cam 17 and of the ball bearing 18 are in contact.

The ring 10 also carries a direct current motor 23, the shaft of which bears a linear cam 24. This motor 23 is disposed 90° away from the motor 16 with respect to the optical axis; that is, this cam 24 acts within the plane of deformation of the parallelogram 5, 6, 7 and 10. A ball bearing 25 is mounted on the portion of the edge of the ring 5 located facing this cam 24, and it is pressed against this edge portion by a spring 26 having a substantially constant force that is fixed on the one hand to the ring 5 and on the other to part of the tubular housing 15. The force of this spring and that of the spring 19 are selected to prevent looseness between the respective cams 17 and 24 and the respective ball bearings 18 and 25 under the influence of a certain acceleration, and in particular under the influence of the highest acceleration that can be communicated to the rings 5 and 10 by the cams 25 [sic] and 17, respectively, which is on the order of 0.5 g.

A plate 28 projects from the ring 5 and extends in a plane that is perpendicular to the plane of displacement of this ring. The opposed surfaces of this plate 28 are reflective, and they are each arranged facing one photodetector, 29 and 30, respectively, each of which is associated with a light source comprising a light-emitting diode. Naturally both these detectors 29, 30 and the detectors 21 and 22 may instead be based on other physical principles, e.g., magnetic, capacitive, inductive, and so forth.

The design of the actuating apparatus for the optical image stabilizing group 2 makes it possible to suppress play, reduce friction and have acceptable inertia of the masses in motion.

The only inherent defect in the apparatus described resides in the fact that although the displacement of the optical group 2 is effected absolutely in a plane parallel to the film plane, this parallel plane is displaced along the arcs of circles described by each of the parallel deformable sides 6, 7, 11, 12 of the parallelograms, such that the focal distance between the film plane and the optical group is not absolutely constant.

The maximum tolerable spacing $\Delta$ between the radius R of the arc of the circle described by the plates 6, 7, 11, 12 and the position of the optical group for a given maximum angular displacement corresponding to a distance y of 0.7 mm from the end of this radius R with respect to the optical axis is 10 $\mu$m. For the isosceles triangle the hypotenuse of which is formed by this radius R, spaced apart by y with respect to the optical axis, in which the third side of the triangle, corresponding to the projection of the radius R on the optical axis, is L, $$L_2 + y_2 = R_2$$

$$(R - \Delta)_2 + y_2 = R_2$$

$$R_2 - 2\Delta R + \Delta_2 + y_2 = R_2$$

$$R = \frac{y_2 + \Delta_2}{2\Delta} \quad \Delta < < y$$

$$\approx y_2/2\Delta$$

$$\approx \frac{(0.7 \cdot 10^{-3})_2}{2 \cdot 10^{-5}} = 24.5 \text{ mm}.$$

This calculation shows that with parallelograms having deformable sides 25 mm long, the error $\Delta$ in the focal distance is kept within the indicated tolerance. This dimension is entirely compatible with a 300 mm telephoto lens.

The embodiment that will now be described comprises the solution that, among those that have been studied, appears to be best adapted to the problem presented. Certainly, the displacement of the plane of the optical image stabilizing group 2 with respect to the film plane can be eliminated completely, as will become apparent below, and the inertia can also be reduced by immersing the masses that are in motion in a liquid. However, these various alternative solutions have other disadvantages, which are not compensated for by the advantages they offer. This is why these alternative solutions will be described only briefly hereinafter by way of example, since their general principle is identical to that in the embodiment described in connection with FIG. 3.

Turning once again to this embodiment, it is found that the deformable sides 6, 7, 11, 12 of the parallelograms have not been embodied with the aid of leaf springs, which would make it simpler to embody the apparatus, because the restoring springs 19 and 26 and the hinges provided by the Mylar ® tongues 8 and 9 would be eliminated. Such a solution has been abandoned, because of the substantial increase in the force of such a spring when it is subjected to flexion. In a position of repose, it is necessary to have a force sufficient for the spring to oppose the displacement of the movable masses under the influence of the acceleration that can be communicated to them, which assumes a leaf spring that in repose is capable of producing a force equivalent to that of the springs 19 and 26, but its force would increase rapidly as soon as the leaf springs are spaced apart from this position of repose, whereas the force of the springs 19 and 26 remains substantially constant.

The variant of FIG. 8 illustrates a solution in which the last optical group 2 is mounted in an inner ring 31 mounted to slide vertically on the interior of an outer ring 32 via a rod 33 that is structurally connected to the inner ring and is mounted to slide in the outer ring 32. A guide 34 facing the rod 33 is fixed on the outer ring 32 and constantly keeps the ring 31 in the plane of the outer ring 32.

The outer ring includes two feet 35 and 36 one both sides of a fixed guide means 37. A rod 38 is fixed on these two feet 35 and 36 and slides in the guide means 37. Another guide 39, facing the guide means 37 and structurally connected to it, serves to keep the displacements of the outer ring 32 inside its plane.

Each of the rings 31 and 32 is associated with a respective spring 40 and 41, which serves to fix the position of each ring with respect to its plane in which it slides by elastically pressing one end of the sliding rods 33 and 38 against linear cams 42 and 43, respectively, that are structurally connected to direct current motors 44 and 45, respectively. The motor 44, which serves to displace the inner ring 31, is structurally connected to the outer ring 32, while the motor 45 that serves to displace the outer ring 32 with respect to the body is fixed to this structure and hence is structurally connected to the guide means 37.

Other variant solutions using guiding slides that displace the optical group 2 in the same plane can also be conceived by one skilled in the art. To obtain precise guidance, however, such solutions generate much more friction than the foregoing solution, in which guidance is provided by the rigidity of the parallelograms in any other plane than the plane of deformation of these parallelograms. The available energy in this case is very much less, which makes it a fundamental factor in the selection of the actuating means.

The variant shown in FIG. 9 is based on the concept of deformable parallelograms shown in FIG. 6. The plates that form these parallelograms comprise bimorphous piezoelectric elements 46, 47, 48 and 49, which makes it possible to replace both the motors and the springs. With this kind of apparatus, the forces necessary for balancing the weight of the elements in motion can advantageously be reduced by immersing the entire apparatus in a sealed casing 50 filled with liquid, the wall of which has a bellows 51 for absorbing the variations in volume, as shown in FIG. 10. The optical correction group 2 is then housed in a sealed tubular housing 52 that is fixed inside the inner ring 53 of the correction apparatus, that is, inside the movable ring of the deformable parallelogram 46, 47 mounted in series with the deformable parallelogram 48, 49, one end of which is fixed to the body via a ring 54 that is concentric with the inner ring 53 in the position of repose. The complexity of this solution, because of the immersion of the masses in motion, and questions of dependability comprise the major disadvantages of this solution.

The variant of FIG. 11 differs substantially from the embodiment of FIGS. 6 and 7 because the two motors 16a and 23a are fixed to the housing of the lens; the motor 23a is no longer structurally connected to the movable ring 10 as the motor 23 was in the embodiment described above.

To avoid the displacements between the cam 24a and the roller 25a that would be produced by displacement of the ring 10a along the double arrow F4 by the cam (not visible in the drawing) of the motor 16a acting on the edge of the ring 5a, the roller 25a is mounted on an intermediate plate 5a that is hinged to a support 55 on which the motor 23a is fixed by a Mylar ® tongue 56. This plate rests against the rectilinear edge of the ring 10a via two rollers 57.

Finally, FIG. 12 is an end view representing the motor 23 of FIGS. 6 and 7 seen end-on. Since this motor is structurally connected to the ring 10 and is capable of displacement in the direction of the double arrow F, this motor can be pressed against the housing 58 of the lens via a roller or ball bearing 59 that slides against a rail 60 that is structurally connected to the housing 58. As a result, the motor 28 is kept from vibrating. This variant represents a kind of alternative between the movable motor 23 of FIGS. 6 and 7 and the fixed motor of FIG. 11.

We claim:

1. An apparatus for stabilizing an image focused by a photographic lens onto a photosensitive surface, in which an optical element that defines the position of the image on this surface is mounted on guide devices that determine two degrees of freedom located in at least one plane parallel to that of the film, and including means for detecting displacements of the lens as a function of time, means for actuating these guide devices along the two respective degrees of freedom, and means for controlling these actuation means for displacing said guide devices proportionally to the displacements detected along said respective degrees of freedom, characterized in that said optical element is structurally connected to a device associated with the first guide means along one of said degrees of freedom, these first guide means being arranged to prevent any movement along the other degree of freedom and being kinematically connected to the second guide means along the other of said degrees of freedom, which are arranged to prevent any movement along the first degree of freedom.

2. An apparatus as defined by claim 1, characterized in that said first guide means include four rigid flat elements disposed in parallel, two by two, and connected with one another via hinge devices, forming a closed-loop structure the cross section of which perpendicular to the respective planes of said flat elements comprises a deformable parallelogram, one of these flat elements being associated with said optical element, while the flat element to which it is parallel is associated with the second guide means, which include two flat elements parallel to one another and parallel to the plane of said deformable parallelogram of the first guide means, hinge elements connecting two respective edges of these two flat elements of the second guide means with said flat element of the first guide means which is associated with them, the two respective opposed edges of these two flat elements of the second guide means being connected via two other hinge elements to a support element of the apparatus, forming a second structure having a cross section in the form of a parallelogram that is deformable in a plane perpendicular to the first.

3. An apparatus as defined by claim 2, characterized in that said hinge elements comprise Mylar ® tongues clinched to the adjacent edges of the flat elements forming the deformable structure of the first and second guide means, a restoring spring being associated with each of these deformable structures to keep them pressed against their respective actuating means.

4. An apparatus as defined by claim 3, characterized in that said spring have a substantially constant force calculated to oppose any displacement of said respective structures under the influence of an acceleration lower than a predetermined threshold.

5. An apparatus as defined by claim 3, characterized in that each of said actuating means comprises a cam structurally connected to the shaft of a direct current motor.

6. An apparatus as defined by claim 2, characterized in that the length of the flat elements hinged to the flat element parallel to them which is associated with the last optical element is selected so that the spacing between the film plane and that of this last optical element, for a given amplitude of displacement along the two degrees of freedom, does not exceed 10 $\mu$m.

7. Process for stabilizing an image focused by a photographic lens onto a photosensitive surface, in which an optical element that defines the position of the image on this surface is mounted on guide devices that determine two degrees of freedom located in at least one plane parallel to that of the film, and including means for detecting displacements of the lens as a function of time, means for actuating these guide devices along the two respective degrees of freedom, and means for controlling these actuation means for displacing said guide devices proportionally to the displacements detected along said respective degrees of freedom, the method characterized by structurally connecting said optical element to a device associated with the first guide means along one of said degrees of freedom and preventing movement along the other degree of freedom by use of the first guide means, and kinematically connecting the first guide means to the second guide means along the other degree of freedom, so as to prevent movement along the first degree of freedom.

8. An apparatus for stabilizing an image focused by an optical system onto a photosensitive surface comprising;
   a first holding means for holding said optical system;
   a second holding means connected with said first holding means with one degree of freedom which is almost perpendicular to the optical axis of said optical system, said second holding means consisting of rigid body; and
   a third holding means for holding said second holding means with one degree of freedom which is almost perpendicular to the optical axis of said optical system, said third holding means having no degree of freedom in substantially the same direction as that between said first holding means and said second holding means.

* * * * *